United States Patent
Walker et al.

(10) Patent No.: US 6,233,613 B1
(45) Date of Patent: *May 15, 2001

(54) HIGH IMPEDANCE PROBE FOR MONITORING FAST ETHERNET LAN LINKS

(75) Inventors: Douglas Walker, Livingston Village; Robin Iddon, Edinburgh, both of (GB)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,294

(22) Filed: Aug. 18, 1997

(51) Int. Cl.$^7$ .................................................. G06F 13/00
(52) U.S. Cl. ...................... 709/224; 709/203; 709/200.3; 709/200.46; 709/246; 370/241; 370/340; 370/238; 324/57 R; 324/322; 324/534; 324/710; 326/30; 364/480; 364/482
(58) Field of Search ................................ 709/203, 200.3, 709/200.46, 224, 246; 370/340, 238, 241; 324/322, 534, 710, 57 R; 326/30; 364/480, 482

(56) References Cited

U.S. PATENT DOCUMENTS

| | | | |
|---|---|---|---|
| 4,845,609 | * | 7/1989 | Lighthart et al. ................... 395/200.3 |
| 5,057,783 | * | 10/1991 | Gubisch ................................ 324/710 |
| 5,504,736 | * | 4/1996 | Cubbison, Jr. ....................... 370/241 |
| 5,586,054 | * | 12/1996 | Tensen et al. ........................ 324/533 |
| 5,596,285 | * | 1/1997 | Marbot et al. .......................... 326/30 |
| 6,085,243 | * | 7/2000 | Fletcher et al. ...................... 709/224 |

OTHER PUBLICATIONS

Donald L. Schilling "Electronic Cironits Discrete and Integrated" 1979, pp. 100–107.*

* cited by examiner

Primary Examiner—Moustafa M. Meky
Assistant Examiner—Hieu C. Le
(74) Attorney, Agent, or Firm—Wagner, Murabito & Hao LLP

(57) ABSTRACT

A high impedance tap for monitoring traffic over a communication link of a fast Ethernet local area network (LAN). The circuit of the present invention is advantageously used for tapping into a fast Ethernet communication link (e.g., bi-directional communication channel) of a LAN using, for instance, 10/100 BaseT Ethernet communication protocol. The novel circuit is particularly useful in point to point communication links (e.g., supporting fast Ethernet communication) where two communication nodes are coupled together using a bi-directional communication link (e.g., two twisted pair cables). Unlike the prior art monitoring probes, the probe of the present invention does not insert itself in series between the communication link, but rather taps onto the communication link in parallel using a high impedance termination circuit thereby leaving the existing communication link undisturbed electrically. By leaving the communication link undisturbed electrically, the probe of the present invention does not introduce latency into the communication link nor does it interrupt the communication link for any reason (e.g., during auto-negotiation sessions or on power down, power interruption, etc.). The high impedance value selected for the present invention is approximately one order of magnitude greater than the individual termination impedance of the communication nodes. The particular termination circuit used can employ a parallel coupled resistor with optional capacitors coupled to each wire of a twisted pair cable. The probe can be attached to a number of different statistics gathering systems (e.g., of the RMOD and RMOD2 standard) or various types of traffic accounting systems.

19 Claims, 10 Drawing Sheets

40

40

HIGH IMPEDANCE PROBE FOR MONITORING FAST ETHERNET LAN LINKS

BACKGROUND OF THE INVENTION

1. Field of The Invention

The present invention relates to the field of local area networks (LANs) using the Ethernet communication protocol (e.g., the IEEE 802.3 Standard). Specifically, the present invention relates to a probe design for monitoring information transmitted over a point to point communication link of a fast Ethernet LAN.

2. Related Art

Networked communication systems ("networks") are very popular mechanisms for allowing multiple computer and peripheral systems to communicate with each other. Local area networks (LANs) are one type of networked communication system and one type of LAN is the Ethernet communication standard (IEEE 802.3). One Ethernet LAN standard, 10 BaseT, communicates at a rate of 10 Megabits per second while another Ethernet LAN standard, 100 BaseT, communicates at a rate of 100 Megabits per second.

There are many well known reasons for which the traffic over a LAN is monitored and monitoring typically uses probes and monitoring equipment. FIG. 1A illustrates a prior art Ethernet LAN system 10 using the 10 BaseT communication standard in which traffic is monitored. In system 10, several communication nodes (e.g., computer systems) 12–18 are individually coupled through communication links to ports of a repeater hub ("repeater") 20. The repeater hub 20 repeats every communication it receives from a node to all other nodes that are coupled to the ports of the repeater 20. Therefore, in order to monitor the traffic of the entire system 10, a single probe 22 can be coupled to a port of the repeater 20 and it then receives all messages that are broadcast by any node 12–18. Although the monitoring configuration of system 10 is relatively straight forward, its communication speed is relatively slow because the technology requires that all messages from one node be repeated (e.g., re-transmitted) by the repeater 20 to all communication nodes in system 10 thereby reducing the overall bandwidth of system 10.

FIG. 1B illustrates a point to point communication link 40 within a fast Ethernet LAN system that allows much faster communication rates compared to the 10 BaseT system 10 of FIG. 1A. In fast Ethernet, e.g., of the 100 BaseT, 100 BaseT2, 100 BaseTX, or 1000BaseT communication standards, repeater hubs are replaced by equipment (e.g., switches, managed hubs, etc.) that establishes point to point communication links 46 between two communication nodes 42 and 44. In this framework, a message sent from one node to the switched hub is not automatically repeated to all other nodes coupled to the switched hub, but is rather communicated only to a select number of other nodes, or, only communicated to a single other node, as shown in FIG. 1B. In the system of FIG. 1B, it is not uncommon for one communication node 42 to have its own bi-directional communication link 46 with another communication node 44. In fast Ethernet LAN systems, the only way to monitor the traffic over the system is to monitor the communication traffic over individual communication links 46 that the system forms between the various communication nodes of the LAN.

As shown in FIG. 1C, within fast Ethernet LAN systems, probe equipment 52 is inserted between prior art communication link 46. This causes the communication link 46 (FIG. 1B) to be separated into two links 46a and 46b that individually link the probe 52 to node 42 and the probe 52 to node 44, respectively. Once inserted between the communication link 46, the probe 52 can gather any required traffic information with respect to the communication link between nodes 42 and 44. However, probe 52 electrically interrupts the communication link 46 because it is inserted in series with the nodes 42 and 44.

There are several disadvantages to the probe configuration shown in FIG. 1C. The first disadvantage is that power down and power interruption protection circuitry must be placed within the probe equipment 52 because if a power interruption occurs, communication between links 46a and 46b will become broken. This power down and power interruption protection circuitry typically includes one or more relays that are used to bypass the monitoring circuitry within probe 52 if power should be interrupted or removed from the probe 52. The relay circuit within probe 52 then restores the communication link 46 during periods of power interruption. However, this circuitry is very expensive and adds to the overall cost of the probe equipment 52. Further, the power interruption prevention circuitry does not switch immediately after the power failure, but rather requires some latency period to restore the communication link 46. During this latency period, the communication link 46 is broken which can cause data loss and/or initiate an auto-negotiation session between node 42 and node 44. Both of these factors further delay communication over point to point communication link 46. It would be advantageous to provide a probe that eliminates the need for power down and power interruption protection circuitry.

The second disadvantage to the probe equipment configuration of FIG. 1C is that the probe 52 must act as a repeater in repeating messages received from node 42 for node 44 and in repeating messages received from node 44 for node 42 because the probe 52 is inserted in series between node 44 and node 42. The act of repeating these messages introduces unwanted latency in the communication between nodes 42 and 44. It would be advantageous to provide a probe that eliminates the need to repeat messages between the linked nodes of a point to point communication link.

The third disadvantage to the probe equipment configuration of FIG. 1C originates due to auto-negotiation sessions between node 42 and node 44. When probe equipment 52 is first placed between communication link 46, the link 46a auto-negotiates between probe 52 and the node 42. Simultaneously, link 46b auto-negotiates between probe 52 and the node 44. Each auto-negotiation session is independent and can, unfortunately, result in an auto-negotiated speed of 10 Megabits for one node (e.g., node 42) and 100 Megabits for the other node (e.g., node 44). This is an impermissible result as the probe equipment 52 is not configured to allow split rate communication between its two different ends. Therefore, specialized software is included within the circuitry of probe 52 to: (1) detect when split rate communication is auto-negotiated; and (2) force the higher communication rate down to 10 Megabits. This specialized software is expensive and adds to the overall cost of the probe 52. Further, the auto-negotiation sessions initiated by an inserted probe 52 and the specialized software (1) takes time to determine if split rate communication was auto-negotiated and also (2) takes time to alter the communication rate of one of the links (e.g., link 46b). Each of the above further introduces unwanted latency in the communication between nodes 42 and 44. It would be advantageous to provide a probe that eliminates the need to auto-negotiate with each communication node of a monitored point to point communication link.

Accordingly, the present invention provides effective probe and monitoring equipment that can be used for monitoring traffic over a point to point communication link but eliminates the need for power down and power interruption protection circuitry. The present invention further provides a probe and monitoring equipment that can be used for monitoring traffic over a point to point communication link but eliminates the need to repeat messages between the linked nodes. Also, the present invention provides a probe and monitoring equipment that can be used for monitoring traffic over a point to point communication link but eliminates the need to auto-negotiate with each communication node of a monitored communication link. These and other advantages of the present invention not specifically mentioned above will become clear within discussions of the present invention presented herein.

SUMMARY OF THE INVENTION

A high impedance tap is disclosed for monitoring traffic over a communication link of an Ethernet local area network (LAN). The circuit of the present invention is advantageously used for tapping into a fast Ethernet communication link (e.g., bi-directional communication channel) of a LAN using, for instance, $10/100$ BaseT Ethernet communication protocol. Fast Ethernet is a network that supports 100 BaseT, 100 BaseT2, 100 BaseTX, and/or 1000BaseT. The novel circuit is particularly useful in point to point communication links (e.g., supporting fast Ethernet communication) where two communication nodes are coupled together using a bi-directional communication link (e.g., two twisted pair cables). Unlike the prior art monitoring probes, the probe of the present invention does not insert itself in series between the communication link, but rather taps onto the communication link (in parallel using three way connectors) and includes a high impedance termination circuit thereby leaving the existing communication link undisturbed electrically. By leaving the communication link undisturbed electrically, the probe of the present invention does not introduce latency into the communication link nor does it interrupt the communication link for any reason (e.g., during auto-negotiation sessions or on power down, power interruption, etc.). The high impedance value selected for the present invention is approximately one order of magnitude greater than the individual internal termination impedance of the communication nodes. The particular termination circuit used can employ a parallel coupled resistor with optional capacitors coupled to each wire of a twisted pair cable. The probe can be attached to a number of different statistics gathering systems (e.g., of the RMOD and RMOD2 standard) or various types of traffic accounting systems.

Specifically, embodiments of the present invention include a probe for monitoring communications over a point to point communication link of a fast Ethernet network, the communication link existing between a first communication node and a second communication node, the probe comprising: a tap for coupling onto the communication link; a receiver magnetics circuit coupled to the tap for receiving signals from the communication link; a high impedance termination circuit coupled to an output of the receiver magnetics circuit, the high impedance termination circuit having an impedance 10 to 20 times that of individual internal termination impedances of the first and the second communication nodes such that the presence of the probe does not disrupt electrical characteristics of the communication link; a physical layer circuit coupled to the high impedance termination circuit, the physical layer circuit for recovering bits from the signals received from the communication link; and a communication monitoring circuit coupled to an output of the physical layer circuit for gathering and maintaining statistical information regarding the communication link.

DETAILED DESCRIPTION OF THE INVENTION

In the following detailed description of the present invention, a high impedance probe for monitoring traffic over a point to point communication link of an Ethernet local area network (LAN), numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
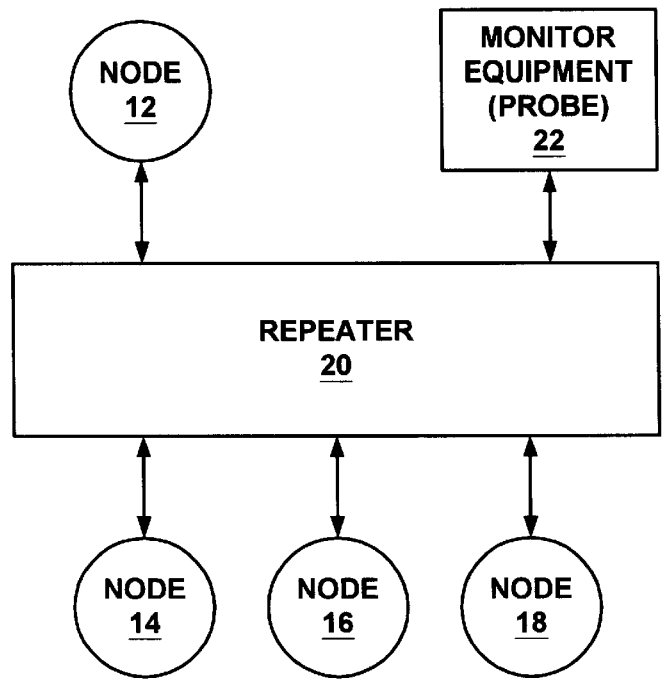
FIG. 1A is a communication system of the prior art using a probe coupled to a standard repeater hub which repeats messages from one communication node to all other communication nodes of the system.
Figure 1B:
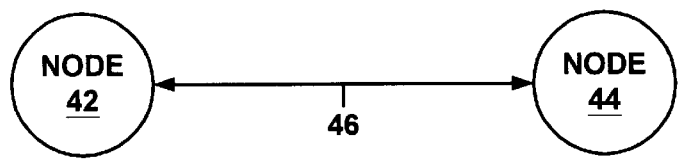
FIG. 1B is an illustration of a point to point communication link in a prior art fast Ethernet local area network communication system.
Figure 1C:
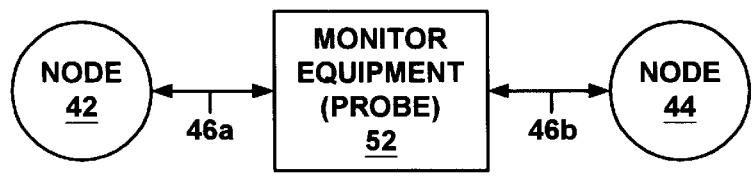
FIG. 1C is an illustration of a prior art probe coupled in series in between a communication link of two communication nodes.
Figure 2:
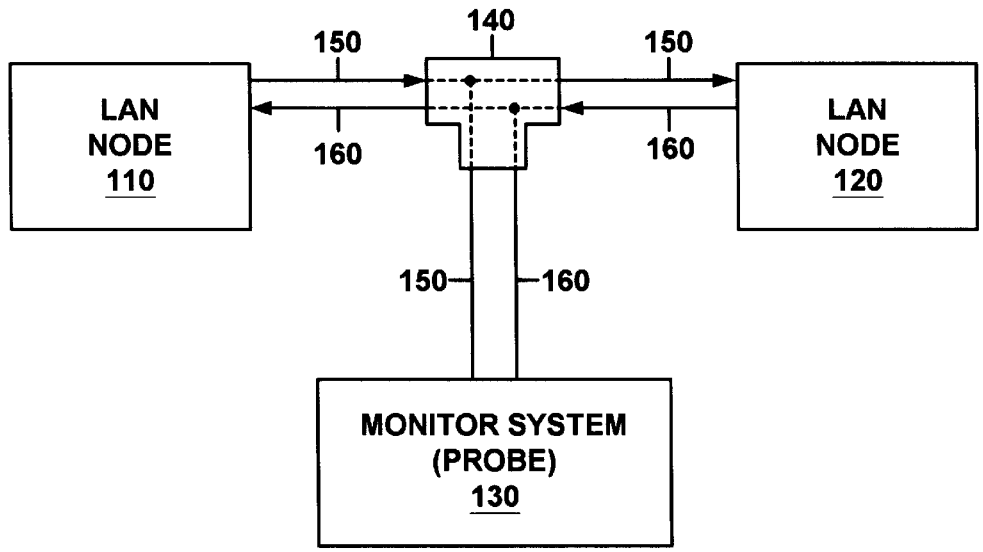
FIG. 2 is a logical diagram of the high impedance probe of the present invention tapping onto a bi-directional point to point communication link using an external three way connector.

FIG. 2 illustrates one embodiment of the present invention used in conjunction with a point to point communication channel in a fast Ethernet communication system 100, e.g., a network including 100 BaseT, 100 BaseT2, 100 BaseTX, and/or 1000 BaseT and can include a mixed network with one of the above standards and 10 BaseT communication. Within this communication system 100, there are one or more point to point links, each communication link bridges at least two communication nodes together. FIG. 2 shows two exemplary communication nodes 110 and 120 coupled together with a point to point communication link. The point to point communication link is bi-directional and is composed of twisted pair line 150 bridging message packets from node 110 to node 120 and also a twisted pair line 160 bridging message packets from node 120 to node 110.

It is appreciated that twisted pair lines 150 and twisted pair lines 160 are each terminated with impedance elements located within each node 110 and 120. This termination impedance is on the order of 100 ohms, but can vary depending on the particular Ethernet standard employed by system 100. Within the present invention, the individual internal termination impedance of the nodes 110 and 120 is called Z.

In this configuration of FIG. 2, the present invention includes an external three way connector 140 which taps onto lines 150 and lines 160, in parallel, to bring lines 150 and lines 160 to probe 130 while not disturbing their connection to node 110 or node 120. It is appreciated that, in this configuration, the presence of probe 130 does not disrupt any communication between nodes 110 and 120. The three way connector 140 contains three ports into which (1) wires from node 110 are connected, (2) wires from node 120 are connected and (3) wires from probe 130 are connected.

Probe 130 of the present invention contains a high termination impedance compared to the internal impedance, Z, of nodes 110 and 120. More specifically, this termination impedance of probe 130 is on the order of 10–20 times the value Z. In the above example where Z is 100 ohms, the termination impedance of the probe 130 is 1 K ohms. By using this high termination impedance, the probe 130 of the present invention is able to directly tap onto lines 150 and lines 160 of the point to point communication link without altering the electrical characteristics of this communication link between nodes 110 and 120.

Advantageously, probe 130 does not require repeater circuitry as used in the prior art because probe 130 is not coupled between the nodes 110 and 120, as done in the prior art, and further because the electrical characteristics of the communication link of FIG. 2 are not altered by the presence of the three way connector 140 or the coupled probe 130. Also, because the presence of probe 130 does not alter the electrical characteristics of the communication link of FIG. 2, probe 130 does not introduce any latency in the communications between node 110 and node 120. Because the presence of probe 130 does not alter the electrical characteristics of the communication link of FIG. 2, probe 130 further does not require the power down and power interruption protection circuitry as required of the prior art. Specifics of the high termination impedance configuration of probe 130 are described further below.

Figure 3:
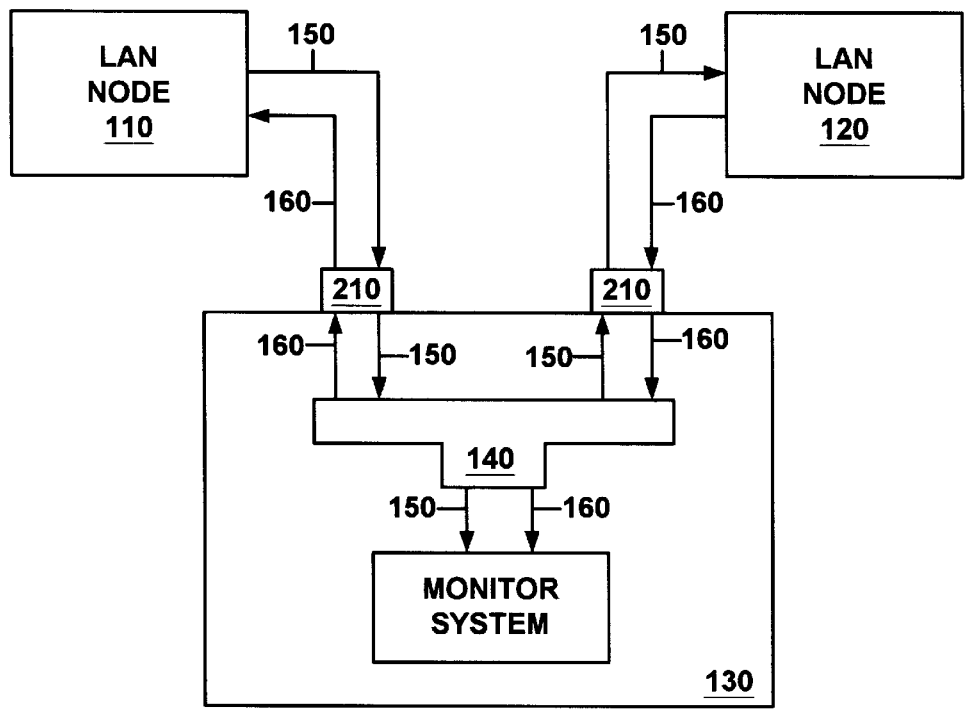
FIG. 3 is a logical diagram of the high impedance probe of the present invention tapping onto a point to point communication link using port connectors of the probe equipment and an internal connector.

FIG. 3 illustrates another embodiment 200 of the present invention where the probe 130 is coupled to the link connection using an internal three way connector 140. In this configuration, twisted pair line 150 from node 110 and twisted pair line 160 to node 110 are coupled to a port 210 of probe 130. Likewise, line 160 from node 120 and line 150 to node 120 are coupled to another port 210 of probe 130. The probe 130 then internally couples to these lines using a parallel three way connection 140 similar to the connector shown in FIG. 2. Although it appears to be connected in series between lines 150 and 160, probe 130 of the present invention is not coupled in series between nodes 110 and 120 in the configuration of FIG. 3 due to the presence of the internal three way connector 140. In like fashion to the configuration of FIG. 2, the probe 130 of FIG. 3 does not disrupt the electrical characteristics of lines 150 and 160 or any communication between nodes 110 and 120.

Figure 4:
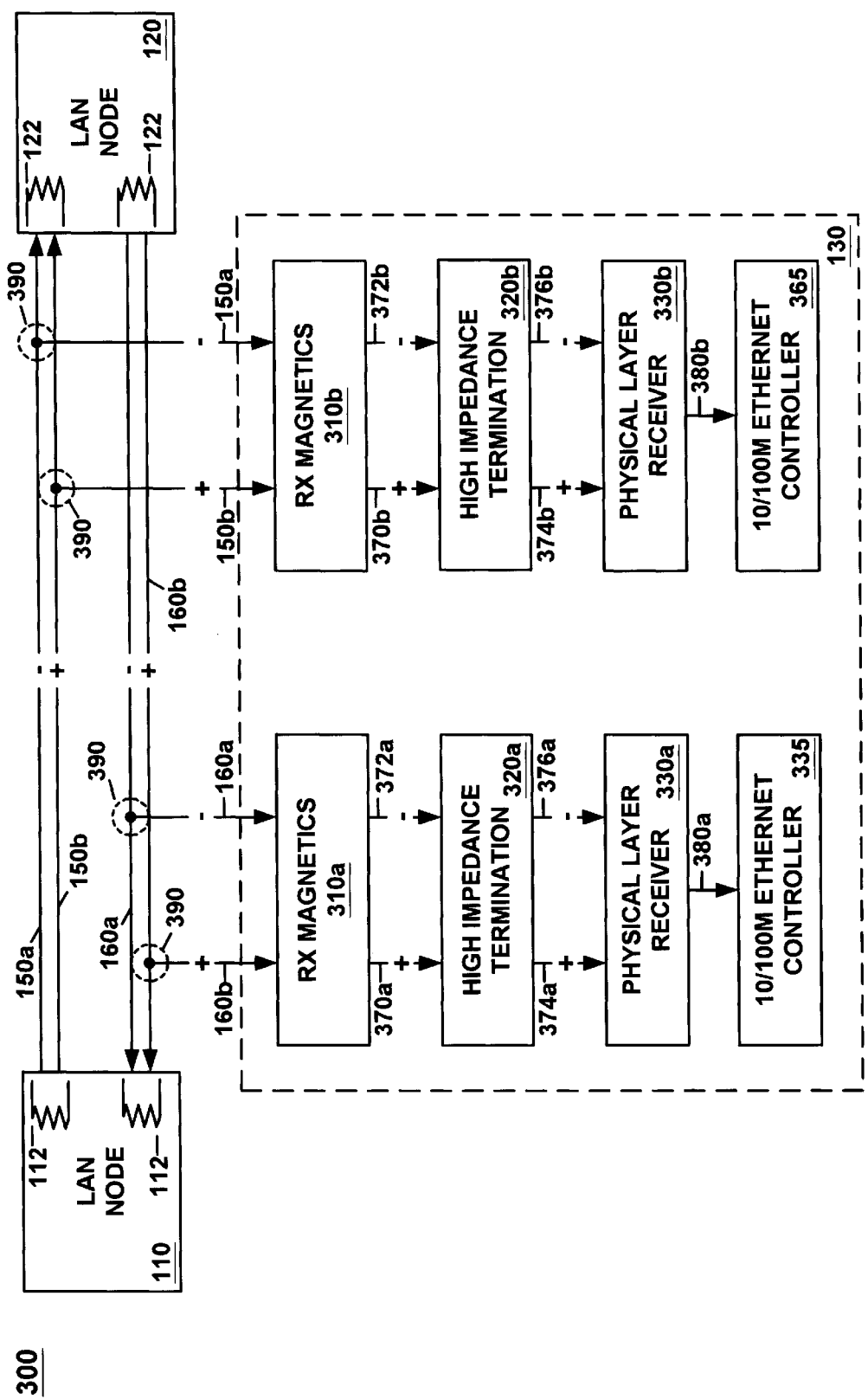
FIG. 4 illustrates a logical block diagram of the internal circuitry of the probe of the present invention including the high impedance termination block.

FIG. 4 illustrates details of the high impedance circuitry within probe 130 of the present invention. LAN nodes 110 and 120 are shown. Twisted pair line 150 as shown includes a (+) line 150b and a (−) line 150a. Twisted pair line 160 as shown includes a (+) line. 160b and a (−) line 160a. Together, lines 150a–b and 160a–b constitute a point to point communication link between nodes 110 and 120. FIG. 4 also shows the internal impedance, Z, of nodes 110 and 120; element 122 represents the internal impedance, Z, of node 120 and element 112 represents the internal impedance, Z, of node 110. In one embodiment, the individual internal impedance, Z, of the nodes 110 and 120 is 100 ohms. The three way connectors (e.g., connections 390) of the probe 130 of present invention, whether external as shown in FIG. 2 or internal as shown in FIG. 3, couple in parallel to the lines 150a–b and 160a–b of the communication link to supply probe 130 with the traffic information over this communication link.

Probe 130 of the present invention contains a receiver magnetics circuit 310a which receives both line 160a and line 160b. The receiver magnetics circuit 310a is well known in the art and any of a number of well known circuits can be used as circuit 310a within the present invention. Receiver magnetics circuit 310a outputs modified signals over line 370a (+) and line 372a (−) to the high impedance termination circuit 320a of the present invention. The high impedance termination circuit 320a provides approximately 10 to 20 times the individual internal impedance, Z, of the communication nodes 110 and 120. In one embodiment, the high impedance termination circuit 320b introduces approximately 1k ohm of impedance into the line 160.

The high impedance termination circuit 320a of FIG. 4 outputs terminated signals over line 374a (+) and line 376a (−) to a physical layer receiver circuit 330a that is capable of receiving either 100 BaseT Ethernet signals or 10 BaseT Ethernet signals. As is well known in the art, the physical layer receiver circuit 330a recovers the bits of a message packet received over line 160. Any of a number of well known physical layer receiver circuits can be used as circuit 330a within the present invention. In an alternative embodiment of the present invention, the physical layer receiver circuit 330a is also capable of recovering bits from 100 BaseT2 and/or 100 Base TX communication. The physical layer receiver circuit 330a transmits a bit stream over bus 380a to a 10/100M Ethernet controller 335.

Ethernet controller 335 of FIG. 4 includes a processor and memory for gathering and maintaining statistical information regarding the message packets transmitted over line 160. It is appreciated that the high impedance termination circuit 320a of the sent invention can operate in conjunction with a number of different statistics gathering devices. However, one such statistics gathering technology that can be employed within the present invention is the Internet Engineering Task Force's RMOD (Remote Monitoring) and RMOD2 standard. According to these well known standards, packet based statistics are gathered and can be used for diagnostic purposes. Alternatively, Ethernet controller 335 can be used to collected and maintain accounting statistics regarding which node sent which information and to which destination, etc. One exemplary statistics monitoring system that can be employed as circuit 335 is the Superstacks II Enterprise Monitor System available from 3COM Corporation of Santa Clara, Calif.

It is appreciated that the present invention includes analogous circuitry for receiving message packets from lines 150a–b. Probe 130 of the present invention contains a receiver magnetics circuit 310b which receives both line 150a and line 150b. Any of a number of well known circuits can be used as circuit 310b of the present invention. Receiver magnetics circuit 310b outputs modified signals over line 370b (+) and line 372b (−) to another high impedance termination circuit 320b of the present invention. The high impedance termination circuit 320b provides approximately 10 to 20 times the individual internal impedance, Z, of the communication nodes 110 and 120. In one embodiment, the high impedance termination circuit 320b introduces approximately 1 k ohm of impedance into the line 150. The high impedance termination circuit 320b outputs terminated signals over line 374b (+) and line 376b (−) to another physical layer receiver circuit 330b that is capable of receiving either 100 BaseT Ethernet signals or 10 BaseT Ethernet signals. As is well known in the art, the physical layer receiver circuit 330b recovers the bits of a message packet received over line 150. Any of a number of well known physical layer receiver circuits can be used as circuit 330b within the present invention. In an alternative embodiment of the present invention, the physical layer circuit 330b is also capable of recovering bits from 100 BaseT2 and/or 100 Base TX communication.

The physical layer receiver circuit 330b of FIG. 4 transmits a bit stream over bus 380b to a $10/100$M Ethernet controller 365. Ethernet controller 365 performs functions analogous to Ethernet controller 335 but is used for monitoring message traffic over line 160. It is appreciated that Ethernet controller 365 and Ethernet controller 335 can be combined into a single statistics gathering and maintenance system that receives message traffic from both lines 150 and 160 and differentiates this data internally to maintain separate statistics on both lines.

It is appreciated that the present invention is able to provide the parallel three way taps 390 onto the point to point communication link of FIG. 4 due to the high impedance termination circuits 320a–b. These circuits 320a–b ensure that the taps 390 to not disrupt the electrical characteristics of the communication link (lines 150 and 160) in any meaningful way. Due to this circuitry, the probe 130 of the present invention avoids the requirement of being placed in series with the communication link, as done in the prior art point to point monitoring equipment. By being removed from the series connection, the probe 130 of the present invention advantageously: (1) avoids the unwanted latencies introduced by series inserted repeater equipment of the prior art; (2) avoids the power down and power interruption protection circuitry required of the series inserted prior art; and (3) avoids auto-negotiation sessions performed by the prior art that are initiated upon probe insertion.

Figure 5A:
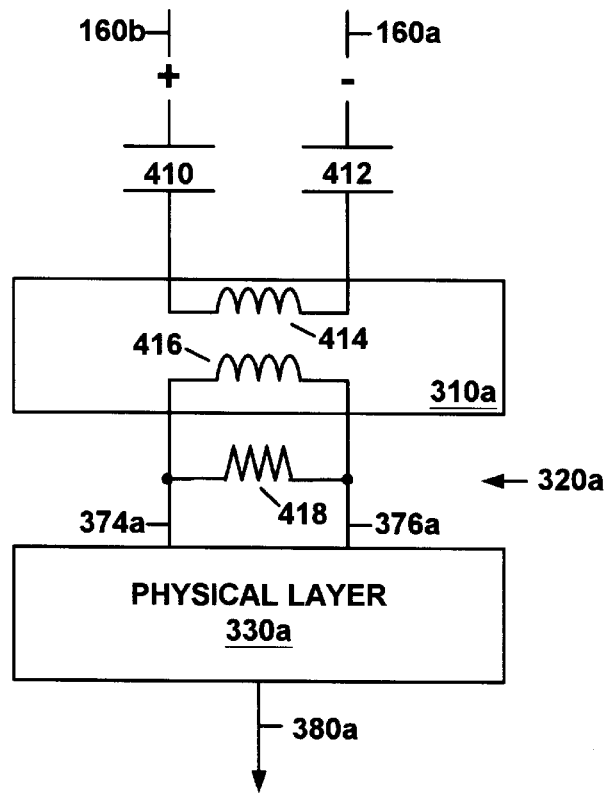
FIG. 5A and FIG. 5B are circuit diagrams illustrating elements of one embodiment of the high impedance probe of the present invention.
Figure 5B:
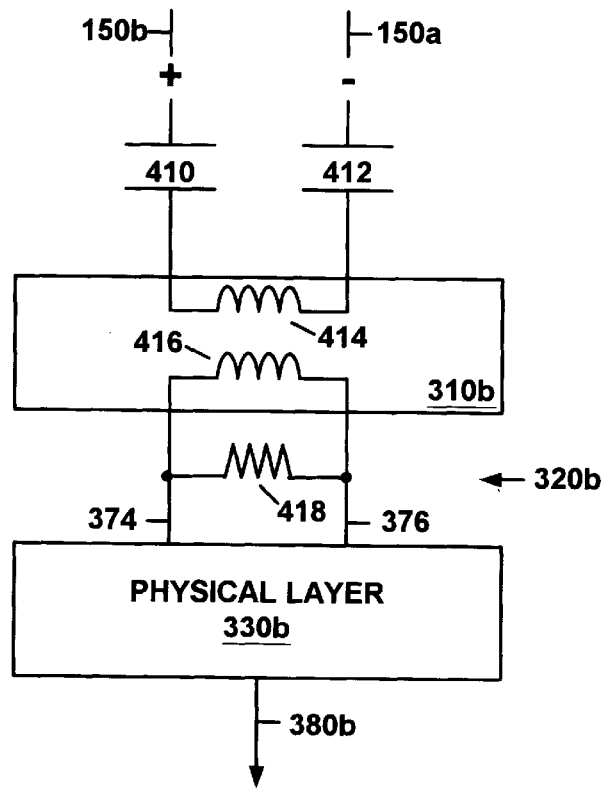

FIG. 5A illustrates one particular configuration 400 used with the high impedance termination circuit 320a of the present invention. Line 160a (−) and line 160b (+) comprise the twisted pair line 160. Line 160a (−) is coupled to one end of capacitor 410 and line 160b (+) is coupled to one end of capacitor 412, as shown. The other ends of the capacitors 410 and 412 are coupled to the inputs of receiver magnetics circuit 310a which couples these lines to either end of one winding of a coil element 414. Each capacitor 410 and 412 is on the order of 1–100 picoFarads. Outputs 374a and 376a are taken from either end of a second coil element 416 of the receiver magnetics circuit 310a. A 1k ohm resistor 418 is coupled across lines 374a and 376a. These two lines 374a and 376a are input into the physical layer 330a. Alternatively, the capacitors 410 and 412 can be eliminated. It is appreciated that FIG. 5B illustrates an analogous configuration 400' for twisted pair line 150 which includes line 150a (−) and line 150b (+)

Figure 6A:
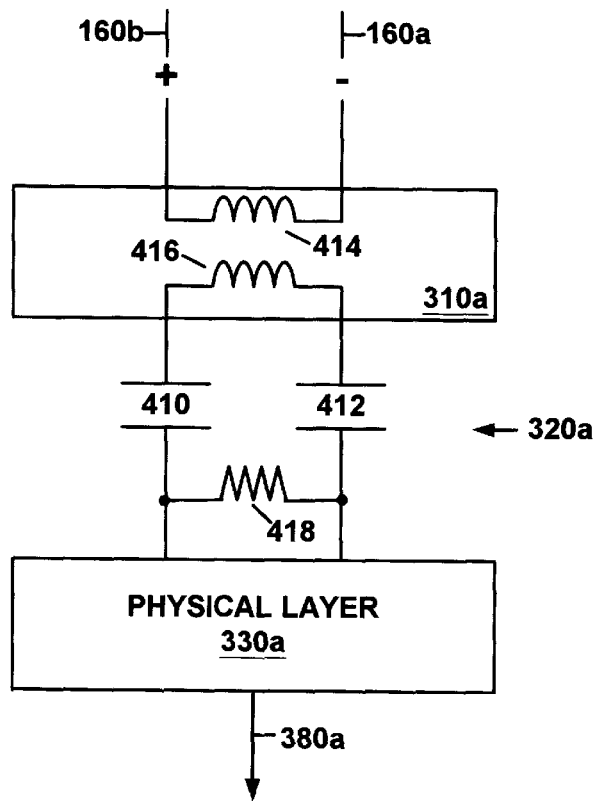
FIG. 6A and FIG. 6B are circuit diagrams illustrating elements of a second embodiment of the high impedance probe of the present invention.
Figure 6B:
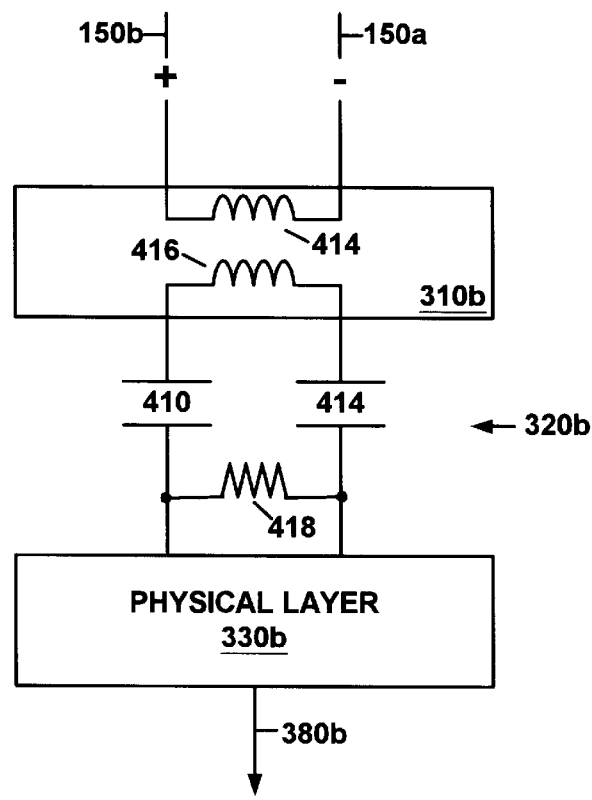

FIG. 6A illustrates another exemplary configuration 500 used with the high impedance termination circuit 320a of the present invention. Line 160a (−) and line 160b (+) are coupled to receiver magnetics circuit 310a which couples these lines to either end of one winding of a coil element 414. Output lines from magnetics circuit 310a are taken from either end of a second coil element 416 and one output line is coupled to one end of capacitor 410 and the other output line is coupled to one end of capacitor 412, as shown. Each capacitor 410 and 412 is on the order of 1–100 picoFarads. The other end of the capacitors 410 and 412 have a 1 k ohm resistor 418 coupled between them and further are coupled to the inputs of physical layer circuit 330a. Alternatively, the capacitors 410 and 412 can be eliminated. It is appreciated that FIG. 6B illustrates an analogous configuration 500' for lines 150a (−) and 150b (+).

The preferred embodiment of the present invention, a high impedance probe is disclosed for monitoring traffic over a point to point communication link of an Ethernet local area network (LAN), is described. While the present invention has been described in particular embodiments, it should be appreciated that the present invention should not be construed as limited by such embodiments, but rather construed according to the below claims.

What is claimed is:

1. A probe for monitoring communications over a communication link of a network between a first communication node and a second communication node, said probe comprising:

a tap for coupling in parallel onto said communication link;

a receiver magnetics circuit coupled to said tap for receiving signals from said communication link;

a high impedance termination circuit coupled to an output of said receiver magnetics circuit, said high impedance termination circuit having an impedance 10 to 20 times that of individual internal termination impedances of said first and said second communication nodes such that the presence of said probe does not disrupt electrical characteristics of said communication link, and wherein said receiver magnetics circuit and said high impedance termination circuit do not introduce any signal into said communication link;

a physical layer circuit coupled to said high impedance termination circuit, said physical layer circuit for recovering bits from said signals received from said communication link; and a communication monitoring circuit coupled to an output of said physical layer circuit for gathering and maintaining statistical information regarding said communication link.

2. A probe as described in claim 1 wherein said communication link is a point to point communication link and wherein said network is a fast Ethernet network.

3. A probe as described in claim 1 wherein said communication link is bi-directional comprising a first twisted pair line transmitting signals from said first communication node to said second communication node and a second twisted pair line transmitting signals from said second communication node to said first communication node.

4. A probe as described in claim 1 wherein said high impedance termination circuit comprises a 1 k ohm resistor.

5. A probe as described in claim 3 wherein said high impedance termination circuit comprises a 1 k ohm resistor and two 1–100 pF capacitors, wherein each capacitor is coupled to a different wire of said twisted pair lines.

6. A probe as described in claim 1 wherein said tap is an external three way connector coupling in parallel onto said communication link.

7. A probe for monitoring communications over a bi-directional communication link of a network between a first communication node and a second communication node, said probe comprising:

a first tap for coupling in parallel onto a first line of said communication link carrying communication from said first communication node to said second communication node;

a second tap coupling in parallel onto a second line of said communication link carrying communication from said second communication node to said first communication node;

a first receiver magnetics circuit coupled to said first tap for receiving signals from said first line of said communication link;

a second receiver magnetics circuit coupled to said second tap for receiving signals from said second line of said communication link;

a first high impedance termination circuit coupled to said first receiver magnetics circuit and having an impedance 10 to 20 times that of individual internal termination impedances of said first and said second communication nodes such that the presence of said probe does not disrupt the electrical characteristics of said first line, and wherein said first receiver magnetics circuit and said first high impedance termination circuit do not introduce any signal into said first line; and a second high impedance termination circuit coupled to said second receiver magnetics circuit and having an impedance 10 to 20 times that of individual internal termination impedances of said first and said second communication nodes such that the presence of said probe does not disrupt the electrical characteristics of said second line, and wherein said second receiver magnetics circuit and said second high impedance termination circuit do not introduce any signal into said second line.

8. A probe as described in claim 7 and further comprising a first physical layer circuit coupled to said first high impedance termination circuit, said first physical layer circuit for recovering bits from said signals received from said first line;

a second physical layer circuit coupled to said second high impedance termination circuit, said second physical layer circuit for recovering bits from said signals received from said second line; and communication monitoring circuits coupled to said first and second physical layer circuits for gathering and maintaining statistical information regarding said communication link.

9. A probe as described in claim 7 wherein said communication link is a point to point communication link and wherein said network is a fast Ethernet network.

10. A probe as described in claim 7 wherein said first line is a twisted pair line and wherein said second line is a twisted pair line.

11. A probe as described in claim 7 wherein said first and said second high impedance termination circuits each comprises a 1 k ohm resistor.

12. A probe as described in claim 10 wherein said first and said second high impedance termination circuits each comprises a 1k ohm resistor and two 1–100 pF capacitors, wherein each capacitor is coupled to a different wire of said twisted pair lines.

13. A probe as described in claim 7 wherein said first and said second taps are each external three way connectors coupling in parallel onto said communication link.

14. A probe for monitoring communications over a point to point bi-directional communication link of a network between a first node and a second node, said probe comprising:

a first tap coupling in parallel onto a first twisted pair line of said communication link carrying communication from said first node to said second node;

a second tap for coupling in parallel onto a second twisted pair line of said communication link carrying communication from said second node to said first node;

a first receiver magnetics circuit coupled to said first tap for receiving signals from said first twisted pair line of said communication link;

a second receiver magnetics circuit coupled to said second tap for receiving signals from said second twisted pair line of said communication link;

a first high impedance termination circuit coupled to said first receiver magnetics circuit and having an impedance 10 to 20 times that of individual internal termination impedances of said first and said second nodes such that the presence of said probe does not disrupt the electrical characteristics of said first twisted pair line, and wherein said first receiver magnetics circuit and said first high impedance termination circuit do not introduce any signal into said first twisted pair line; and a second high impedance termination circuit coupled to said second receiver magnetics circuit and having an impedance 10 to 20 times that of individual internal termination impedances of said first and said second nodes such that the presence of said probe does not disrupt the electrical characteristics of said second twisted pair line, and wherein said second receiver magnetics circuit and said second high impedance termination circuit do not introduce any signal into said second twisted pair line.

15. A probe as described in claim 14 and further comprising a first physical layer circuit coupled to said first high impedance termination circuit, said first physical layer circuit for recovering bits from signals received from said first twisted pair line;

a second physical layer circuit coupled to said second high impedance termination circuit, said second physical layer circuit for recovering bits from signals received from said second twisted pair line; and communication monitoring circuits coupled to said first and second physical layer circuits for gathering and maintaining statistical information regarding said communication link.

16. A probe as described in claim 15 wherein said network is a fast Ethernet network.

17. A probe as described in claim 15 wherein said first and said second high impedance termination circuits each comprises a 1 k ohm resistor.

18. A probe as described in claim 15 wherein said first and said second high impedance termination circuits each comprises a 1 k ohm resistor and two 1–100 pF capacitors, wherein each capacitor is coupled to a different wire said twisted pair lines.

19. A probe as described in claim 15 wherein said first and said second taps are each external three way connectors coupling in parallel onto said communication link.

* * * * *